Patented Apr. 13, 1926.

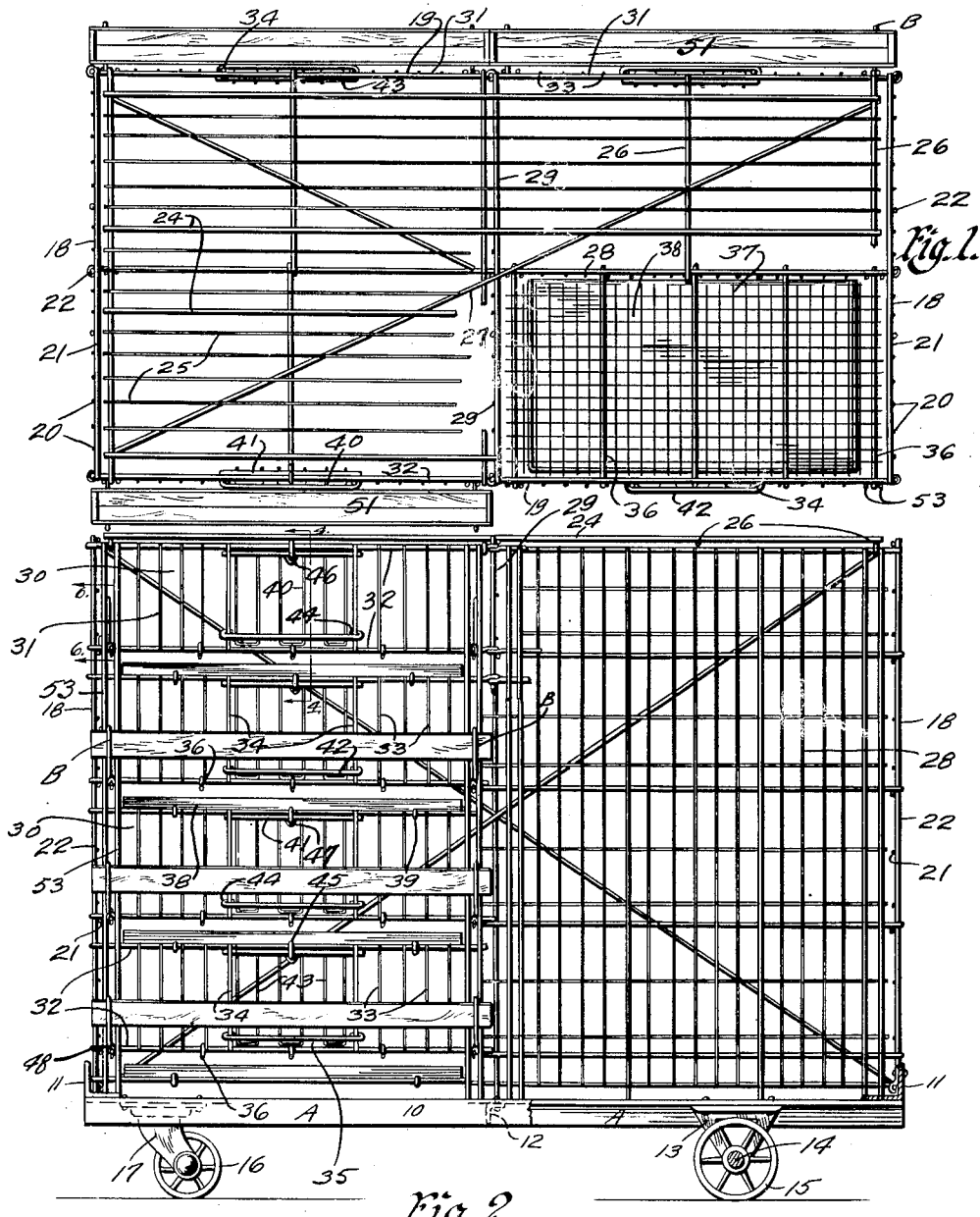

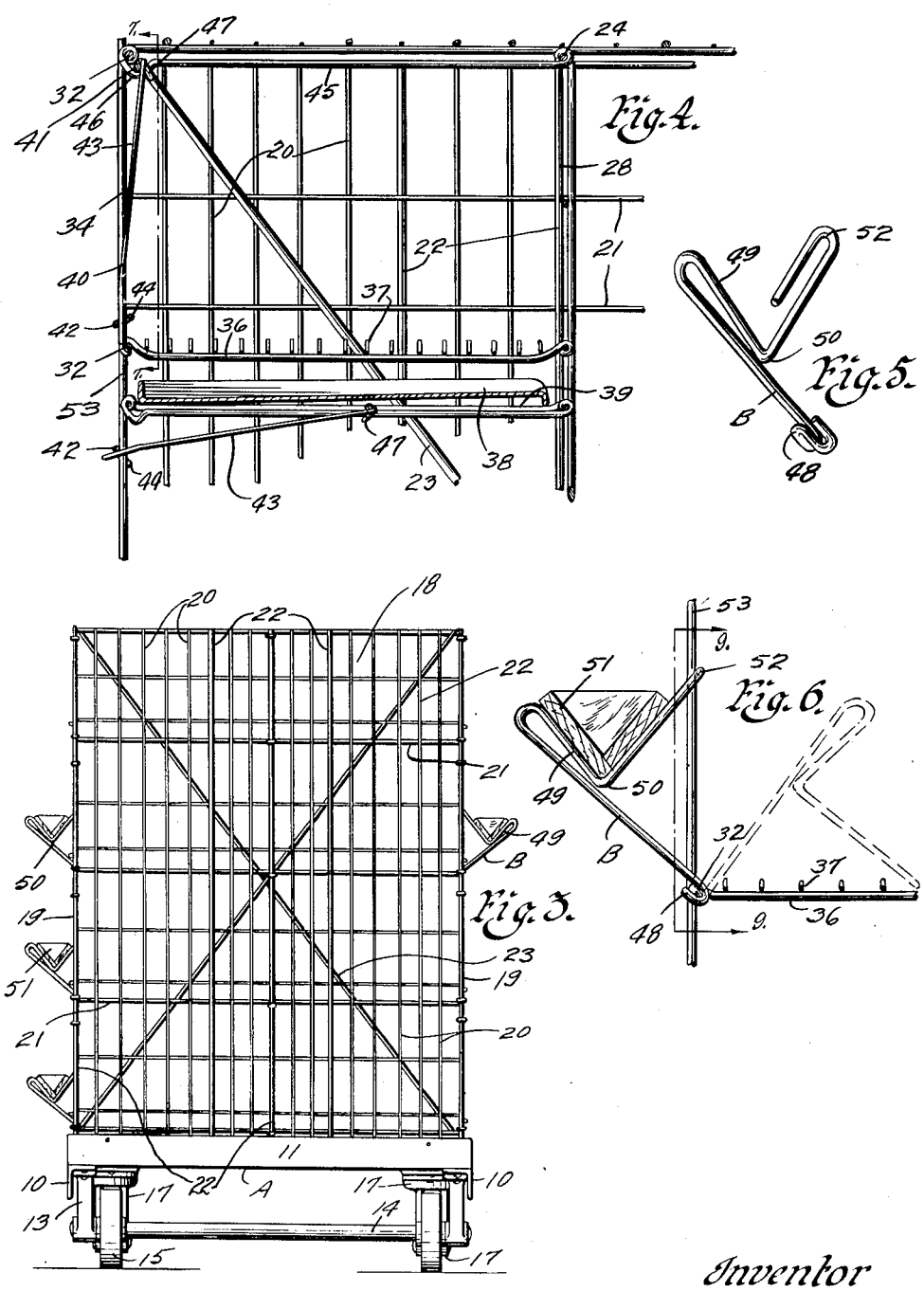

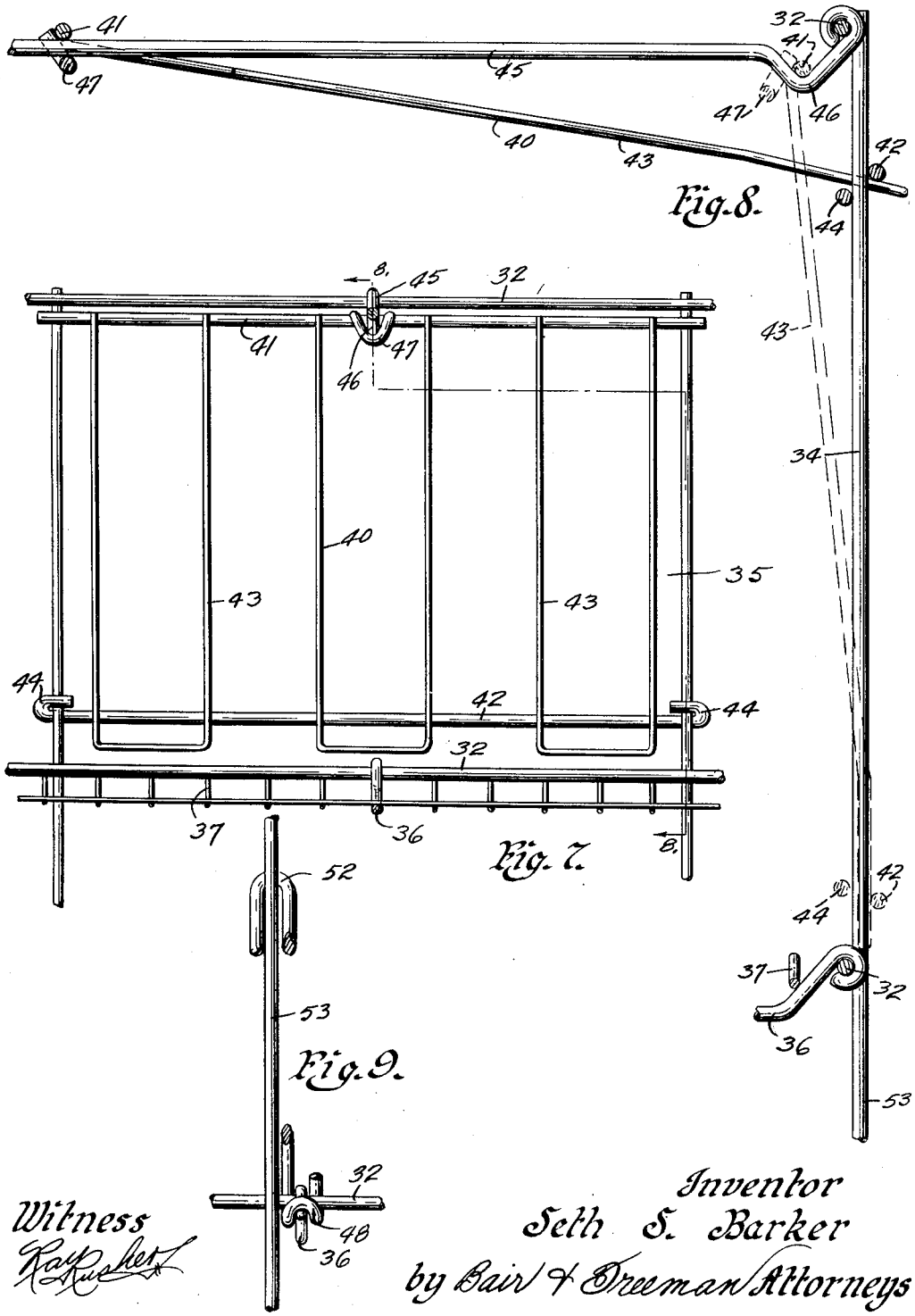

1,580,774

UNITED STATES PATENT OFFICE.

SETH S. BARKER, OF OTTUMWA, IOWA.

POULTRY-FEEDING BATTERY.

Application filed January 12, 1925. Serial No. 1,888.

*To all whom it may concern:*

Be it known that I, SETH S. BARKER, a citizen of the United States, residing at Ottumwa, in the county of Wapello and State of Iowa, have invented a certain new and useful Poultry-Feeding Battery, of which the following is a specification.

The object of my invention is to provide a poultry feeding battery of the all wire type, of simple, durable and comparatively inexpensive construction.

More particularly, it is my object to provide the poultry feeding battery of comparatively light wire spot welded together and arranged with proper wire reinforcing braces, whereby the feeding battery will maintain its rigidity even though made of comparatively light wires.

Still a further object is to provide a door member slidably mounted and opening inwardly for each of the compartments of the feeder.

Still a further object is to provide a recessed bottom in each compartment so that any eggs within the compartment may be prevented from rolling out through the sides of the feeder itself.

Still a further object is to provide a hanger capable of movement from position within the outline of the feeder to position without the outline of the feeder for supporting troughs adapted to contain the poultry feed.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top, plan view of my improved battery feeder, parts being broken away to illustrate the fine wire mesh which forms a floor for each compartment of the feeder.

Figure 2 is a front view of the feeder, a part of the front wall being removed for showing the center wall which divides the feeder vertically into compartments.

Figure 3 is an end view of the feeder showing the X wires for reinforcing the end wall.

Figure 4 is an enlarged detail, sectional view taken on line 4—4 of Figure 2, showing the pans below each compartment as well as the doors for gaining access into the compartment.

Figure 5 is a perspective view of one of the hangers which support the feeding troughs.

Figure 6 is a detail, sectional view taken on line 6—6 of Figure 2 showing the trough hanger in operative position as well as in inoperative position, in dotted lines.

Figure 7 is a detail, sectional view taken on line 7—7 of Figure 4 showing the door for each compartment of the feeder.

Figure 8 is a sectional view taken on line 8—8 of Figure 7, one position of the door being shown in dotted lines; and Figure 9 is a sectional view taken on line 9—9 of Figure 6.

In the accompanying drawings, I have used the reference character A to refer generally to a base frame which consists of a pair of longitudinally spaced angle bars 10 connected together at their ends by cross angle iron pieces 11.

A center angle iron 12 also connects the two pieces 10 together as shown in dotted lines in Figure 2 of the drawings.

The angle iron bars 10, 11 and 12 form the complete base frame A.

A pair of bearings 13 are fixed to the angle iron bars 10 and have an axle 14 journalled therein upon which is mounted the wheels 15.

Castor wheels 16 mounted in suitable bearings 17 are secured to the other end of the bars 10 whereby the entire feeder may be moved from place to place.

The feeder is made up of a number of strands of wire and consists of four outer walls, two of which are end walls 18 and the other two are side walls 19.

The walls 18 are formed of strands of wire 20, which extend from the lower end of the feeder to the upper end thereof and are connected to cross wires 21.

The strands of wire 20 are of comparatively light material and to add rigidity to the end walls I employ heavier vertical wires 22, as clearly shown in Figure 3 of the drawings.

The end walls 18 are also braced by wires 23, which are arranged in the form of an X, that is, extending diagonally from one corner to the opposite corner.

The wires 22, as well as the wires 23 are spot welded to the cross wires 21. The wires 21 are preferably made of the same weight material as the wires 22.

The feeder also has a top 24 which includes a number of strands of light wire 25 connected together by the cross wires 26 to which they are spot welded.

Reinforcing wires 27 extend diagonally from one corner of the top 24 to the opposite corner thereof, similar to the bracing wires 23 in the end walls 18.

The feeder includes a vertical partition or wall 28 which extends from one end wall 18 to the other end wall 18 midway between their side edges for dividing the entire feeder into two large compartments.

An intermediate wall 29 arranged midway between the end walls 19 and parallel therewith extends at right angles to the wall 28 and on each side thereof. The wall 29 thus divides the compartments formed by the wall 28 into two separate compartments.

The walls 28 and 29 are made up similar to the end walls 18, that is, of wires extending horizontally and vertically and spot welded together.

From the construction of the parts just described, it will be seen that the entire feeder as heretofore described, is divided into four compartments. Each compartment just referred to is then sub-divided into a number of horizontally disposed compartments 30. One compartment is clearly illustrated in Figure 4 of the drawings, and I will now describe such compartment in detail.

The side walls 19 of the feeder are made up in sections, that is, one small section for each compartment 30. The sections of the walls 19, I have referred to by the reference numeral 31.

The sections 30 include a pair of cross wires 32 connected together by a number of vertical strands of wire 33.

In addition to the vertical strands of wire 33, the upper and lower cross wires 32 are connected together by comparatively heavy vertically arranged wires 34.

The wires 34 are spaced apart and the space between them and the upper and lower cross wires 32 define the door opening 35 leading into each compartment 30.

In order to form a bottom for each compartment, I provide a number of wires 36 which extend from the side walls 19 to the center wall 28.

The wires 36 are bent downwardly near their outer and inner ends so as to form a sort of recessed floor or bottom when the coarse meshed screen wire 37 is placed thereon. The screen wire 37 is of sufficient mesh to permit the poultry to stand thereon.

The inclined portions of the wires 36, when the mesh wire 37 is arranged thereon will prevent any eggs from rolling out through the sides of the feeder.

Supported directly below the mesh wire 37 for each compartment is a pan 38 supported upon cross wires 39.

The sections 31 of the side wall 19 are spaced apart for permitting the pan 38 to be removed and cleaned.

Each compartment 30 has a door 40 for closing the door opening 35.

The door 40 includes an upper cross wire 41 and a lower cross wire 42. The cross wire 41 rests against the inner side of the wires 34, which define the door opening, as clearly shown in Figure 7 of the drawings.

The upper and lower cross wires 41 and 42 are connected together by comparatively light strands of wire 43, which have their lower ends connected together, that is, substantially U-shaped as shown in Figure 7 of the drawings.

The wires 43 are spot welded to the cross wires 41 and 42.

The cross wire 42 is formed with a pair of looped ends 44, which extend around and slide on the vertically arranged wires 34.

A guide rod 45 extends from the side wall 19 to the center wall 28 substantially midway between the vertical wires 34 and it is upon this guide rod 45 that the upper end of the door 40 rests when moved to open position, as I will now describe.

The door 40 when in closed position assumes the position shown in Figure 4 in solid lines, and in Figure 8 in dotted lines.

The guide rod 45 is formed with a receiving notch 46 which tends to retain the door 40 in closed position.

In order to permit the cross wire 41 of the door 40 to slide upon the guide rod 45, I extend a U-shaped loop 47 around the guide rod 45, and then fix the ends of the U-shaped loop 47 to the cross piece 41 of the door 40.

When it is desired to open the door, all that is necessary is to engage the cross piece 42 moving it upwardly, whereupon the cross wire 41 held in position by the loop 47, is slid upon the guide rod 45 causing the door 40 to assume the position shown in solid lines in Figure 8 of the drawings.

The looped ends 44 of the door 40 engage the vertical wires 34 to such an extent that the door will be retained in raised position by the frictional engagement between the looped ends 44 and the vertical wires 34.

The movement of the door 40 upwardly and inwardly enables it to be opened without interfering with any of the poultry within the feeder itself.

In order to support the V-shaped feed troughs upon the feeder adjacent each compartment 30, I provide hangers B, which are formed of a single strand of wire and bent to position shown in Figure 5 of the drawings as I will now describe.

One end of the hanger B is formed with a double U-shaped portion 48 which engages around the lower cross wire 32 of the sections 31.

The main body portion of the hanger then extends outwardly, and is again bent to substantial U-shaped position, as at 49.

The portion 49 terminates into a portion bent substantially V-shaped, as at 50, and it is upon this portion that the V-shaped feed troughs 51 may rest.

In order to retain the hangers B in proper position to support the feed troughs 51, I form a hook 52 at one end of the hanger B, which hook extends around one of the vertical wires 53 which forms a part of the frame work for the side walls 19.

The hanger B, when not in use and after the trough 51 is removed therefrom, may be pushed inwardly within the feeder until it assumes the position shown in Figure 6 of the drawings.

When it is desired to gain access into the compartments 30 through the doors, it is necessary to first remove the troughs 51.

It is desirable to move the hangers B to position within the outline of the feeder because the feeders are moved from place to place either for filling them with poultry or taking them therefrom.

The advantage of my feeder resides in the construction of an all wire frame wherein the parts can be spot welded together, thus enabling me to manufacture and market a substantial feeder at a comparatively low price.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A battery feeder for poultry comprising a wheel mounted frame, a wire frame work mounted on said frame for forming end and side walls and a top, a vertical partition wall in said wire frame work extending between two walls thereof, horizontal bottoms for dividing the feeder into a number of poultry receiving compartments one above another, said partition wall dividing the decks into compartments, a door for each of said compartments, vertical and horizontal guide members for the door, said door being slidably mounted on said guide members and capable of being moved within the compartment until it assumes a substantially horizontal position.

2. A battery feeder for poultry comprising a wheel mounted frame, a wire frame work mounted on said frame for forming end and side walls and a top, a vertical partition wall in said wire frame work extending between two walls thereof, horizontal bottoms for dividing the feeder into a number of poultry receiving compartments one above another, said bottoms being recessed for forming an inclined flange along the outer edges, said partition wall dividing the decks into compartments, a door for each of said compartments, vertical and horizontal guide members for the door, said door being slidably mounted on said guide members and capable of being moved within the compartment until it assumes a substantially horizontal position.

3. A battery feeder for poultry comprising a wheel mounted frame, a wire frame work mounted on said frame for forming end and side walls and a top, a vertical partition wall in said wire frame work extending between two walls thereof, horizontal bottoms for dividing the feeder into a number of poultry receiving compartments one above another, said bottoms being recessed for forming an inclined flange along their outer edges, a removable pan below each of said compartments, said partition wall dividing the decks into compartments, a door for each of said compartments, vertical and horizontal guide members for the door, said door being slidably mounted on said guide members and capable of being moved within the compartment until it assumes a substantially horizontal position.

Des Moines, Iowa, December 5, 1924.

SETH S. BARKER.